(No Model.)
G. D. LEONARD.
NOSE BAG.
No. 417,256. Patented Dec. 17, 1889.
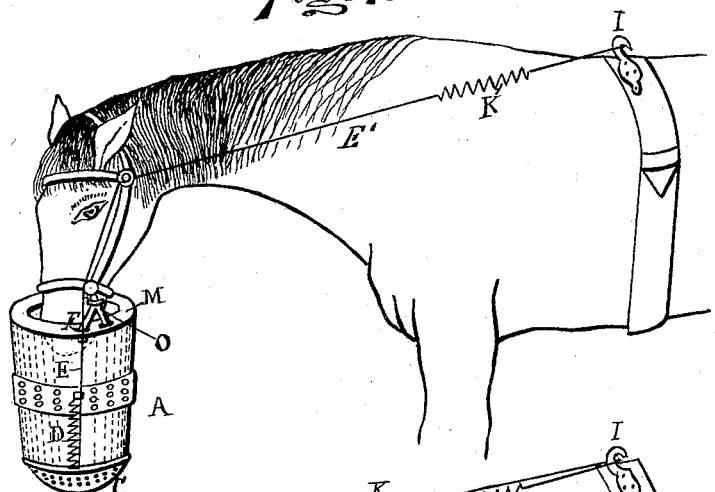
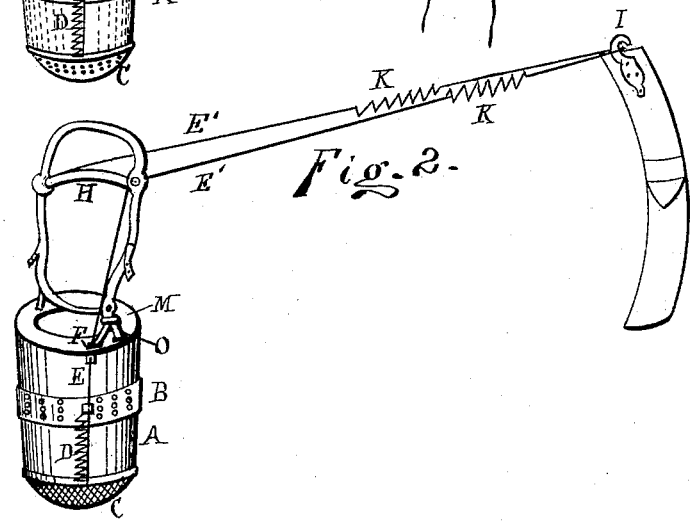
Witnesses
M. P. McKee.
L. M. Bartlett.
Inventor.
Geo. D. Leonard,
By W. H. Bartlett
Atty.

UNITED STATES PATENT OFFICE.

GEORGE D. LEONARD, OF NEW HAVEN, CONNECTICUT.

NOSE-BAG.

SPECIFICATION forming part of Letters Patent No. 417,256, dated December 17, 1889.

Application filed July 2, 1889. Serial No. 316,303. (No model.)

*To all whom it may concern:*

Be it known that I, GEORGE D. LEONARD, residing at New Haven, in the State of Connecticut, have invented certain new and useful Improvements in Nose-Bags for Feeding Animals, of which the following is a specification, reference being had therein to the accompanying drawings.

This invention relates to nose-bags or feed-bags for animals and the mechanism for supporting and retaining the same on the animal.

The object of the invention is to produce a nose-bag from which the animal may feed without spilling any of the grain, and which will be supported in a position comfortable to the animal and accessible to the teamster.

Figure 1 is a side elevation and partial perspective of the bag applied to a horse. Fig. 2 is a perspective of bag and attachments in relation to a bridle.

A indicates the bag, preferably of canvas or light leather. The bag has a hoop or band B, of heavy leather, wood, or rope, around the middle of the body. This hoop or band may be riveted or stitched to the bag above and below, and perforated to serve as a ventilator.

The bottom of the bag may be of wood; but it is preferably of perforated metal secured by stitching or rivets.

The bottom of the bag is connected to the band B by a spring D, one spring being at each side of the bag; or three or more springs may be employed. The springs D will be strong enough to lift the bottom of the bag with a small amount of grain, but will expand when the bag is filled with grain, permitting the bottom of the bag to drop to the full length of the sides. The springs D will only draw up or collapse the lower end of the bag.

The bottom of the bag may be ventilated, if desired.

The bottom of the bag has two cords or straps E attached thereto, one at each side. These cords pass upward and through a hole F near the top of the bag. The cords then pass over a strap of the bridle, as the forehead-strap H, and then extend backward toward the checkrein-hook I. The cord or strap E is supplied with springs K between the bridle and the point of attachment to the harness. These springs K hold up the bag into convenient position for the animal to eat, but will give somewhat if the animal thrusts his nose down into the bag. These springs also permit the bag to be pulled away from the head of the animal for a moment without detaching the cord from hook I should it be desired to inspect the feed or to add a quantity of feed or salt to the contents of the bag. The cords E' may be attached to the bridle or to cords E.

The upper edge of the bag has an inturned flange M, which prevents waste. The cord E passes through this flange, as shown in the drawings at F.

Supporting-straps O, connected to the bag near the top, may be tied to the halter or bridle. These straps or cords preferably pass loosely through holes in the flange M and are secured to the inside of the nose-bag.

It will be understood that the strap or cord E may be thrown over the hames or other part of the harness, as well as over hook I.

The lower portion of the bag will collapse or fold up against the ring without wrinkling to such an extent as to distort the bag, as would be the case if the springs extended from bottom to top of bag.

What I claim is—

1. The combination, with a flexible nose-bag, of a hoop surrounding said bag about midway of the length thereof, and a spring at each side of said bag connecting said hoop with the bottom of the bag, whereby the bottom portion only of the bag will be collapsed by the springs, substantially as described.

2. The combination, with a nose-bag, of straps or cords extending upward from the sides thereof to pass through some part of the bridle, springs connected to said cords or straps above the nose-bag, and a cord or strap connection from these springs to some part of the harness, substantially as described.

In testimony whereof I affix my signature in presence of two witnesses.

GEORGE D. LEONARD.

Witnesses:
HENRY M. SHANNON,
F. H. HEMINGWAY.